United States Patent
Hamza et al.

(10) Patent No.: US 8,330,810 B2
(45) Date of Patent: Dec. 11, 2012

(54) SYSTEMS AND METHOD FOR DYNAMIC STABILIZATION OF TARGET DATA DETECTED FROM A MOVING PLATFORM

(75) Inventors: Rida Hamza, Maple Grove, MN (US); Steven Martinez, Albuquerque, NM (US)

(73) Assignee: Honeywell International Inc., Morristown, NJ (US)

( * ) Notice: Subject to any disclaimer, the term of this patent is extended or adjusted under 35 U.S.C. 154(b) by 617 days.

(21) Appl. No.: 12/359,916

(22) Filed: Jan. 26, 2009

(65) Prior Publication Data

US 2009/0212994 A1 Aug. 27, 2009

Related U.S. Application Data

(60) Provisional application No. 61/031,896, filed on Feb. 27, 2008.

(51) Int. Cl.
*H04N 7/00* (2011.01)
*H04N 7/18* (2006.01)
*H04N 9/47* (2006.01)

(52) U.S. Cl. .................... 348/116; 348/117

(58) Field of Classification Search .......... 701/205, 701/207, 210, 213, 214, 215, 217, 218, 220, 701/466, 408, 411, 468, 469, 470, 472, 492, 701/500; 348/113, 116, 117, 118, 119
See application file for complete search history.

(56) References Cited

U.S. PATENT DOCUMENTS

| | | | |
|---|---|---|---|
| 2,978,177 A * | 4/1961 | Newell et al. ............... 702/181 |
| 3,775,767 A * | 11/1973 | Fielding ..................... 342/37 |
| 5,075,776 A | 12/1991 | Cheung |
| 5,109,425 A | 4/1992 | Lawton |
| 5,508,930 A * | 4/1996 | Smith, Jr. ................... 701/201 |
| 5,745,173 A | 4/1998 | Edwards et al. |
| 5,798,786 A | 8/1998 | Lareau et al. |
| 5,878,165 A | 3/1999 | Ono |
| 6,072,525 A | 6/2000 | Kaneda |
| 6,144,338 A * | 11/2000 | Davies ..................... 342/357.33 |
| 6,172,641 B1 * | 1/2001 | Millington ............... 342/357.31 |
| 6,489,922 B1 * | 12/2002 | Lin et al. .................. 342/357.32 |
| 6,867,799 B2 * | 3/2005 | Broemmelsiek ............. 348/169 |
| 7,071,970 B2 | 7/2006 | Benton |
| 7,120,875 B2 | 10/2006 | Daily et al. |
| 7,162,101 B2 | 1/2007 | Itokawa et al. |
| 7,248,963 B2 * | 7/2007 | Baiada et al. ................ 701/120 |
| 7,250,966 B1 | 7/2007 | Engelsberg |
| 7,265,661 B2 | 9/2007 | Satou |
| 7,315,324 B2 | 1/2008 | Cleveland et al. |
| 2003/0146869 A1* | 8/2003 | Lin et al. .................. 342/357.14 |
| 2006/0140481 A1 | 6/2006 | Kim et al. |
| 2006/0256200 A1 | 11/2006 | Matei et al. |

* cited by examiner

*Primary Examiner* — Nicholas Giles
(74) *Attorney, Agent, or Firm* — Ingrassia Fisher & Lorenz, P.C.

(57) ABSTRACT

Systems and methods for detecting a present location of a target from a moving platform are provided. One system includes a movement module for estimating the present location of the target, a prediction module for estimating future locations of the target, and a first processor. The first processor is configured to receive present location estimates, receive future location estimates, store the future location estimates to create a first future location estimate, and determine the present location of the target based on the present location estimate and/or the first future location estimate. One method includes receiving an estimate of the present location of the moving platform, receiving an estimate of a future location of the moving platform, and determining the present location of the target based on the estimate of the present location and/or the estimate of the future location.

15 Claims, 4 Drawing Sheets

SYSTEMS AND METHOD FOR DYNAMIC STABILIZATION OF TARGET DATA DETECTED FROM A MOVING PLATFORM

CROSS-REFERENCE TO RELATED APPLICATIONS

This application claims the benefit of U.S. Provisional Application No. 61/031,896, filed on Feb. 27, 2008.

TECHNICAL FIELD

The present invention relates generally to providing guidance to vehicle operators, and more particularly, relates to detection and tracking of moving or stationary targets in imagery including that from Infrared, visible or MMW sensors. The platforms are equipped with an image sensor and the field of view is specifically chosen to allow the system to accurately detect and track a target of interest.

BACKGROUND OF THE INVENTION

The need to detect and track targets from moving platforms is driving the development of sensor fusion and computer vision algorithms for next-generation situational awareness and navigation systems. For instance, safely landing an aircraft requires accurate information about the location of the runway while military targeting systems for urban environments require accurate localization to avoid collateral damage and civilian casualties.

Recent research efforts have attempted to analyze sensor data using moving platforms to enable the commander, with additional features, to easily navigate or identify potential hazards or imminent threats, to avoid these hazards, and to obtain sufficient visual reference of the actual target. In addition, researchers analyzing moving platform cameras have had to deal with further shortcomings, such as the competing background clutter, changing background dynamics and artifacts due to motion.

On the other hand, the detection of targets is generally carried out through the implementation of segmentation and tracking techniques based on image correlation as maintained by a static platform hypothesis or static scene hypothesis and subsequently, by analyzing the resultant sequence of frames independently. When there are significant dynamics in the scene or the target is moving rapidly, this type of analysis usually results in jitter artifacts due to incomplete motion compensation from the sensor and/or the platform.

Thus, there is a need to analyze real-time sensor images from moving platforms while taking into account the platform and sensor dynamics to compensate for the motion to allow an accurate estimate of the target location. This provides the operator with the visual references of the target needed to act appropriately, whether for safe navigation, targeting enemies, or avoiding hazards. This apparatus provides accurate visual cues from sensor images based on a combined solution that takes into account the system dynamics and the observation measurements.

BRIEF SUMMARY OF THE INVENTION

Various embodiments provide systems for detecting a present location of a target from a moving platform. One system comprises a movement module configured to estimate the present location of the target with respect to the moving platform, a prediction module coupled to the movement module and configured to estimate future locations of the target based on estimates received from the movement module and movement characteristics of the moving platform, and a first processor coupled to the movement module and the prediction module. The first processor is configured to receive present location estimates from the movement module, receive future location estimates from the prediction module, store the future location estimates to create a first future location estimate, and determine the present location of the target based on the present location estimate from the movement module and/or the first future location estimate from the prediction module.

Other embodiments provide filters configured to determine a present location of a target from a moving platform. One filter comprises means for receiving an estimate of a present location of the moving platform and means for receiving an estimate of a future location of the moving platform. The filter further comprises memory configured to store the estimate of the future location of the moving platform and means for determining the present location of the target based on the estimate of the present location of the moving platform, and/or the estimate of the future location of the moving platform.

Various embodiments also provide methods for determining a present location of a target from a moving platform. One method comprises the steps of receiving an estimate of a present location of the moving platform, receiving an estimate of a future location of the moving platform, and determining the present location of the target based on the estimate of the present location of the moving platform and/or the estimate of the future location of the moving platform.

DETAILED DESCRIPTION

An apparatus is presented to stabilize target detection estimates by correlating system dynamics attributes and observation measurements. In the following descriptions, certain aspects of the invention are described in conjunction with pictorial illustrations and block diagrams. Those skilled in the art will appreciate that the scope of the invention is not limited to these illustrations. We use runway segmentation as an example to illustrate and detail the concept of the apparatus introduced here. Modifications in the section, design, and arrangement of components and steps discussed in what follows maybe made without departing form the intended scope of the invention.

Figure 1:
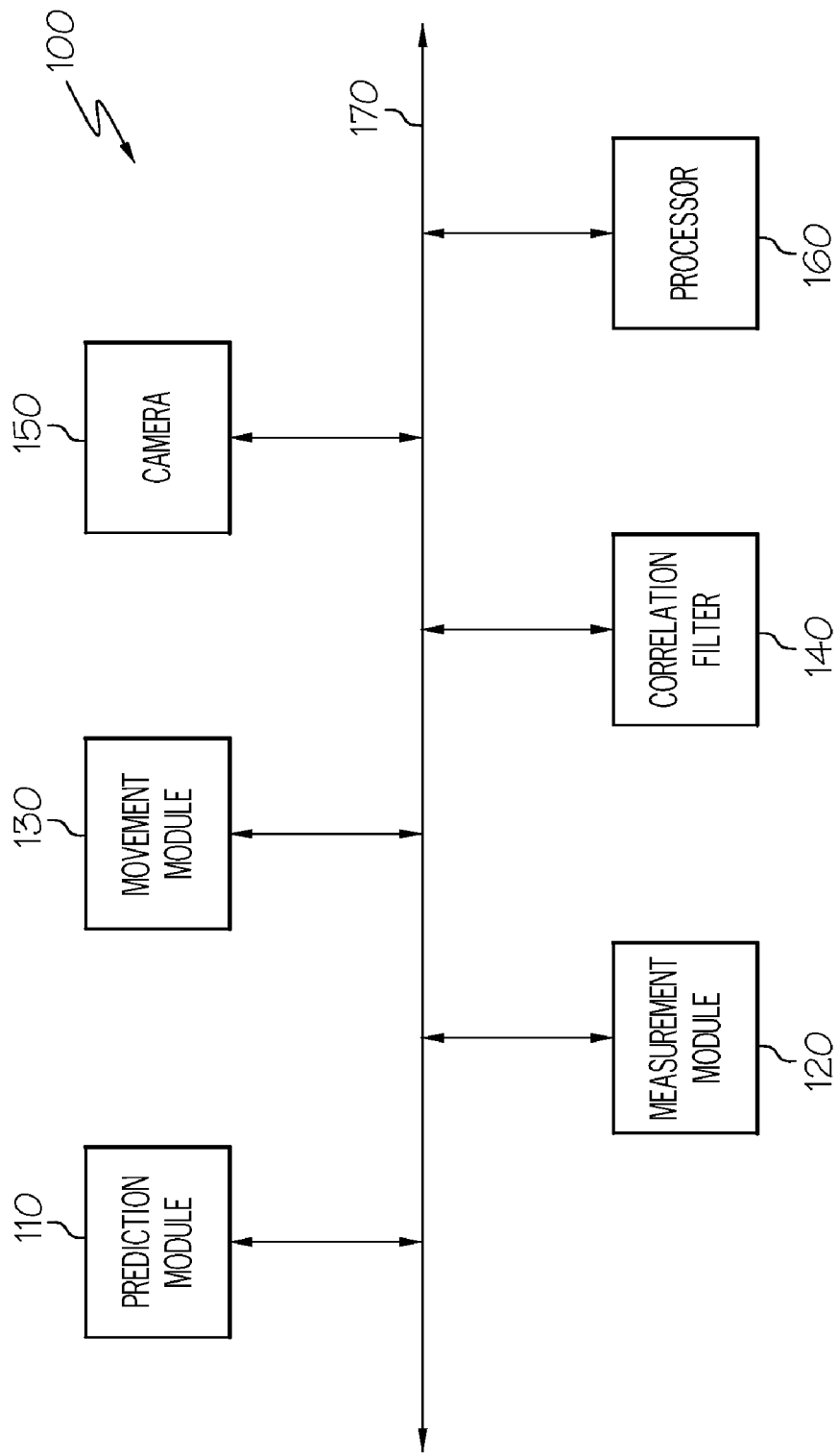
FIG. 1 is a block diagram of an exemplary system for detecting a present location of a target from a moving platform.

FIG. 1 is a block diagram of one exemplary embodiment of a system 100 for detecting a present location of a target from a moving platform. At least in the embodiment illustrated in FIG. 1, system 100 includes a prediction module 110, a measurement module 120, a movement module 130, a correlation filter 140, a camera 150, and a processor 160 in communication with one another via a bus 170 (e.g., a wired and/or wireless bus).

Prediction module 110 may include any system, device, hardware, software (e.g., instructions on a computer-readable medium), or a combination thereof (e.g., a processor) capable of storing and/or retrieving data related to various geographic regions. For example, prediction module 110 may be comprised of a map database, a global positioning system, a navigation system, a synthetic vision system, and/or the like systems.

Measurement module 120 may include any system, device, hardware, software (e.g., instructions on a computer-readable medium), or combination thereof (e.g., a processor) capable of identifying and locating the position of a target (e.g., a runway, landing strips, a landing pad, a road, an obstacle, an object, a landmark, and the like). In one embodiment, measurement module 120 is a system for recognizing the location as described in co-pending U.S. patent application Ser. No. 12/329,276, filed on Dec. 5, 2008, which application is incorporated herein by reference, in its entirety.

Movement module 130 may be any system, device, hardware, software (e.g., instructions on a computer-readable medium), or a combination thereof (e.g., a processor) capable of determining the movement of a vehicle over time. For example, movement module may include a navigation system, a global positioning system, and/or the like apparatus and/or systems.

Correlation filter 140 may be any system, device, hardware, software, or combinations thereof capable of determining the position of a target (e.g., a runway). In one embodiment, correlation filter 140 is a weighted-average filter architecture, referred to hereafter as an autoregressive moving average (ARMA) filter. In another embodiment, correlation filter 140 is a filter using a Kalman-based architecture to determine the position of a target, which embodiment is referred to hereafter as a "Kalman filter."

In one embodiment, the ARMA filter is configured to formulate the target (e.g., runway) location estimate as:

$$\widehat{x}_k = \alpha \widehat{x}_{(k-1)} + (1-\alpha)z_k, \quad (1)$$

where $z_k$ defines the measurement of the corner location. The variables $\widehat{x}_k$ & $\widehat{x}_{(k-1)}$ in equation (1) represent the current and previous estimates of the target location, respectively. The variable $\alpha$ is a weighting factor that smoothes the target location estimate (the weighting factor varies; i.e. $0 \leq \alpha \leq 1$; when $\alpha=1$, current measurements are ignored and when $\alpha=0$, prior measurements are ignored). Each location is defined by a single variable. In what follows, the analysis includes both x and y coordinates and replaces $\alpha$ with a weighted vector.

If the noise distributions are known or empirically measurable, this may provide a good statistical framework to determine the scale a from the statistical parameters.

The ARMA filter is configured to assume that the inherent measurement uncertainty in $z_k$ estimate is defined by a standard deviation $\sigma_v$. Each type of sensor has fundamental limitations related to the associated physical medium, and when pushing the envelope of these limitations the signals are typically degraded. In addition, some amount of random electrical noise is added to the signal via the sensor and the electrical circuits. Many modeling techniques are available to estimate the statistical behavior of these typical noises. Thus, the ARMA filter can deduce a conditional probability of the measure x(t) (e.g. the location of a corner), conditioned on the measured value of being $z_k$. Mathematically the conditional PDF function can be modeled as: $f_{x/z}(t) \sim N(z_k, R=\sigma_v^2 I)$. In one embodiment, the noise is modeled as white Gaussian and thus the covariance matrix is a scalar multiplied by the identity matrix.

Similarly, $\sigma_w$ is defined as the direct measure of the system uncertainty, and thus the conditional probability measure of the estimated can be represented as: $f_{x/\check{x}}(t) \sim N(\check{x}_k, Q=\sigma_w^2 I)$.

At this point, two measurements are available for estimating the actual target position. The maximum likelihood estimate for the combined measurements at frame k is hence:

$$\widehat{x}_k = \frac{\sigma_v^2}{(\sigma_v^2 + \sigma_w^2)} \check{x}_k + \frac{\sigma_w^2}{(\sigma_v^2 + \sigma_w^2)} z_k \quad (2)$$

Equation (2) yields a good estimate of the weight factor $$\alpha = \frac{\sigma_v^2}{(\sigma_v^2 + \sigma_w^2)}.$$

The relative weighting between the two summations will be a function of the variance ratio. Readily conditional probability with narrower distributions, will receive the higher weights.

Ideally, $\alpha$ in equation (1) is chosen based on the dynamics of the vehicle and the characteristics of the sensor including factors such as lens zoom, range to the target and resolution of the sensor and good characterization of inherent noises as described in equation (2). Practically, this compensation is usually non-stationary due to the changing dynamics of the vehicle that is dependent on wind conditions and other uncontrollable factors. These statistical parameters in equation (2) may vary at all times. Accordingly, $\alpha$ is dynamically adapted based on the residual of the estimate:

$$\epsilon_k^2 = |\widehat{x}_k - z_k|^2. \quad (3)$$

Of note, in an ideal situation, $\alpha=1$ when $\epsilon_k=0$ and $\alpha=0$ when $\epsilon_k \gg 0$. In general, $\alpha$ can be expressed as being equal to $g(e)$ (i.e., $\alpha=g(\epsilon)$). $\alpha$ is prevented from reaching the upper and lower limits, and is constrained to the following values:

$$\alpha = \begin{cases} \alpha_{max}; & \varepsilon < \varepsilon_{min} \\ g(\varepsilon); & \varepsilon_{min} \leq \varepsilon \leq \varepsilon_{max} \\ \alpha_{min}; & \varepsilon > \varepsilon_{max} \end{cases} \quad (4)$$

The parameter limits are empirically determined based on the field of view of the sensor, and the maximum desired worst case jitter of the estimates. The function $g(\epsilon)$ is chosen such that its gradient decays slowly with respect to the sensor frame rate. While this formulation of the weighting factor $\alpha$ allows the adaptation of the ARMA estimate to track the non-stationary dynamics of the vehicle and sensor, in practice the computed factor could be quite noisy due to the differencing operation in equation (4). Practically a can also be smoothed as $\alpha_k = \beta \alpha_{k-1} + (1-\beta)g(\epsilon)$, where the scalar $\beta$ is chosen based on the rate of adaptation desired. In one embodiment, a response time of about 0.5 seconds is used.

The corner location is estimated using the transformation approximation derived from the template transition: $\check{x}_k = T \check{x}_{(k-1)}$, where T is a linear affine transformation estimated from the navigation data and template transitions. Kalman filter embodiments of correlation filter 140 replaces $\vec{x}_k$ in equation (1) with a transformation of the previous estimate. In these embodiments, the analysis includes both Cartesian coordinates and uses vector notations to obtain a combined estimate for the $k^{th}$ measurement vector, which can be represented as follows:

$$\vec{x}_k = \begin{bmatrix} \hat{x}_k \\ \hat{y}_k \end{bmatrix} = \vec{\alpha} T_k \vec{x}_{(k-1)} + (1-\vec{\alpha})\vec{z}_k \quad (5)$$

$$\vec{\alpha} = \begin{bmatrix} \alpha_x \\ \alpha_y \end{bmatrix}.$$

Since equation (5) accounts for the warping effect of affine transform due to motion translation. Because the combination calculates an updated state estimate using the new measurement, the state estimate covariance must also be changed to reflect the information just added, resulting in a reduced uncertainty.

To obtain desired estimates that are statistically optimal in the sense that they minimize recursively the mean-square estimation error and properly weigh the runway segmentation noisy estimates, the measurements can be formulated as a Kalman Filter. The recursive nature of the Kalman filter allows for efficient real-time processing to reduce the jittering effects among sequential frame reports. Kalman modeling enables the Kalman filter to account for the disparate character of the jittering due to errors in different instantaneous frames and provides an optimal integrated combination estimate while also maintaining the evolution of the system in time and using all available past information.

The Kalman filter estimates a process by using a form of feedback control. That is, the Kalman filter estimates the process state for each frame and then obtains feedback in the form of noisy measurement. To account for the aircraft state dynamics, it is assumed that the aircraft has moved prior to taking the next measurement. Further, assume that the following model approximates the corner location transition due to aircraft motion in a simplistic form:

$$\frac{dx(t)}{dt} = u(t) + w(t) \quad (6)$$

where u(t) is a nominal velocity or changes of coordinates per unit time (per frame). The variable w(t) represents an additive white normal process noise that models the system uncertainty of the actual motion due to disturbances in AVS modeling package, off nominal conditions, and errors from the source of processed information. This noise w(t) is modeled as zero mean white Gaussian f(w)~N(0, Q).

First, the appropriate statistical models of the state and measurement processes are determined so that the proper Kalman gains can be computed. In this framework, each corner of the target is processed separately to define a single state vector (i.e. coordinates per each vertex) that is unknown but assumed to be constant. The Kalman filter, hence is defined to addresses the general problem of trying to estimate the state $$\vec{x}_k = \begin{bmatrix} x_k \\ y_k \end{bmatrix} \in \Re^2$$

of discrete time controlled process that is governed by the linear stochastic difference equation:

$$\vec{x}_k = A\vec{x}_{(k-1)} + B\vec{u}_k + \vec{w}_{(k-1)}, \quad (7)$$

with a measurement $\vec{z}_k \in \Re^2$ defined as:

$$\vec{z}_k = H\vec{x}_k + \vec{v}_k. \quad (8)$$

The random variable v represents the measurement noise (i.e. a distribution function with the following form $f_v(v) \sim N(0, R)$). Both process and measurement noise are treated as being independent from each other and having normal distributions. In practice, the process noise covariance matrix Q and measurement noise covariance matrix R maybe changing in time, but are treated as constant.

Figure 2:
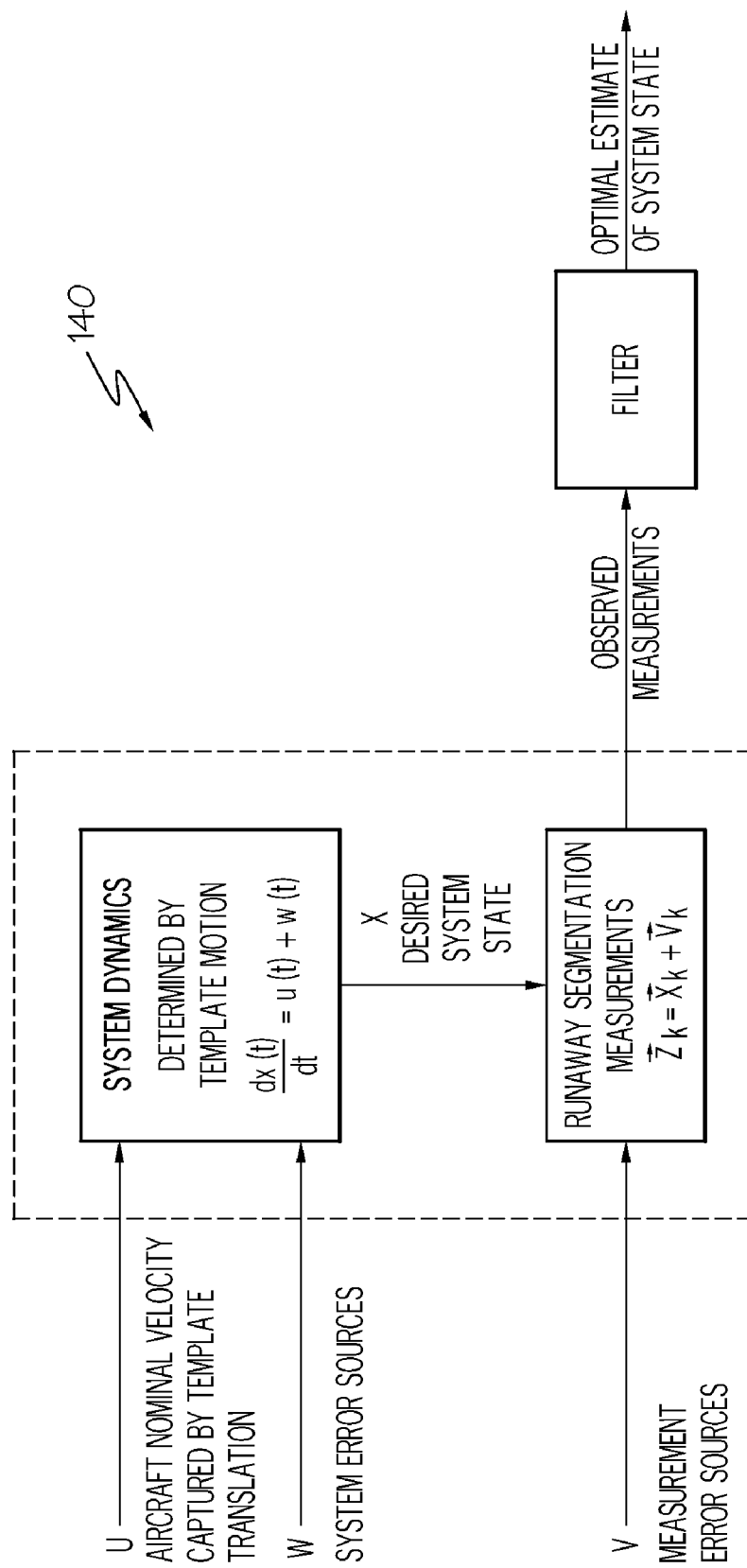
FIG. 2 is a block diagram of one exemplary embodiment of a Kalman filter included within the system of FIG. 1.

FIG. 2 illustrates the architecture of one embodiment of a Kalman Filter architecture. To determine the state dynamics matrix A and the control input matrix B, consideration is given to equation (6), at time $t_k^-$, just before the measurement from a runway segmentation algorithm is taken at time $t_k$, the a priori conditional estimate can hence be expressed mathematically as:

$$\hat{x}(t_k^-) = \hat{x}_{(t_{(k-1)})} + u(t_k - t_{(k-1)}) \quad (9)$$

This presents a state process equation form as it evolves with time. This implies that the state dynamics matrices A and B in the difference equation (7) are identity matrices. In the sequel, H in the measurement equation is treated as an identity matrix.

Returning to the vector presentation, the a priori state at step k (given knowledge of the process prior to step k) is defined as: $\vec{x}_k^- \in \Re^2$, and $\hat{\vec{x}}_k \in \Re^2$ is defined as a posteriori state estimate at step k given the measurement: $\vec{z}_k \in \Re^2$ Here, the t term is dropped out for notation convenience. The a priori and a posteriori estimate errors can be defined as: $\tilde{e}_k = \vec{x}_k - \vec{x}_k^-$; and $\vec{e}_k = \vec{x}_k - \hat{\vec{x}}_k$; the a priori estimate error covariance is then:

$$P_k^- = E[\tilde{e}_k \tilde{e}_k^T];$$

and the a posteriori estimate error covariance is $P_k = E[\vec{e}_k \vec{e}_k^T]$. With mathematical manipulations, the a priori error covariance matrix evolves as:

$$P_k^- = AP_{(k-1)}A^T + Q \quad (10)$$

In deriving the equations for the Kalman filter, one goal is to find an equation that computes a posteriori state estimate $\hat{x}_k$ as a linear combination of an a priori estimate $\vec{x}_k^-$ and a weighted measurement innovation. The innovation residual reflects the discrepancy between the predicted measurement and the actual measurement. In one embodiment, the Kalman a posteriori state estimate equation is defined as:

$$\hat{\vec{x}}_k = \vec{x}_k^- + K_k(\vec{z}_k - H\hat{\vec{x}}_k^-) \quad (11)$$

The matrix K is the blending factor or gain that minimizes the a posteriori error covariance equation.

$$K_k = P_k^- H^T (H P_k^- H^T + R)^{-1} \quad (12)$$

Looking at equation (12), it is evident that as the measurement error covariance R approaches zero (i.e. more reliable estimates from the segmentation algorithm), the gain K more heavily weights the residual. On the other hand, as the a priori estimate error covariance $P_k^-$ approaches zero (i.e. less aircraft motion), the gain K weights the residual less heavily, and the actual measurement is trusted less, while the predicted measurement is trusted more as it saturates.

The a posteriori state estimate equation is rooted in the probability of the a priori estimate conditioned on all prior measurements based on Bayes rules. The a posteriori state estimate reflects the mean (e.g. a first moment) defined in equation (11) of the state distribution—it is normally distributed $p(\vec{x}_k/\vec{z}_k) \sim N(\hat{\vec{x}}_k, P_k)$. The a posteriori estimate error covariance equation reflects the variance of the state distribution (the second non-central moment), and is given by the formula:

$$P_k = (I - K_k H) P_k^-  \qquad (13)$$

Equations (9) and (10) represent the predict equations, while equations (11), (12), and (13) represent the correction update equations in a typical Kalman filter formulation.

Figure 3:
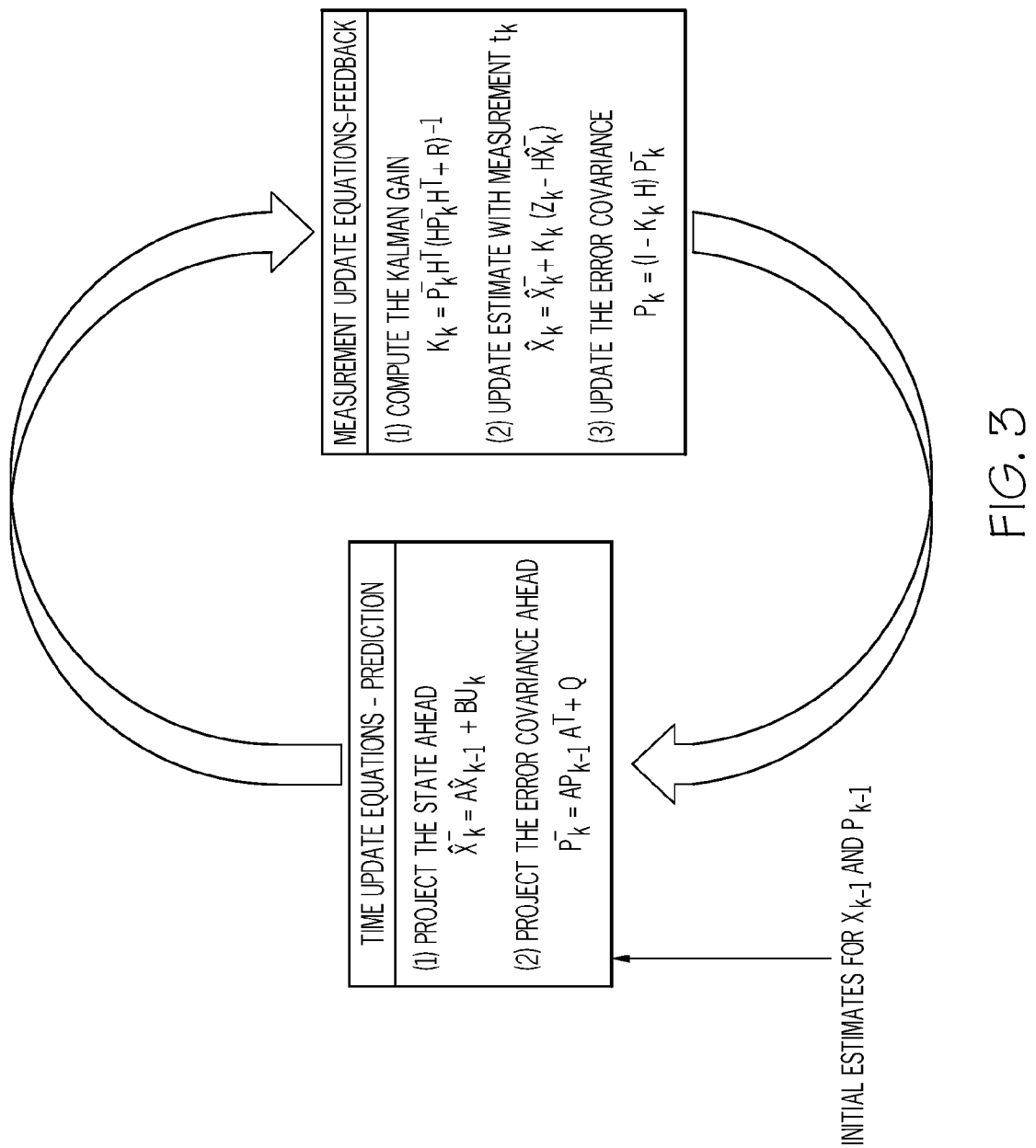
FIG. 3 illustrates equations representing the general operation of a Kalman filter.

The Kalman filter estimates a process by using a form of feedback control: the filter estimates the process state at some time and then obtains feedback in the form of noisy measurement as shown in FIG. 3.

Figure 4:
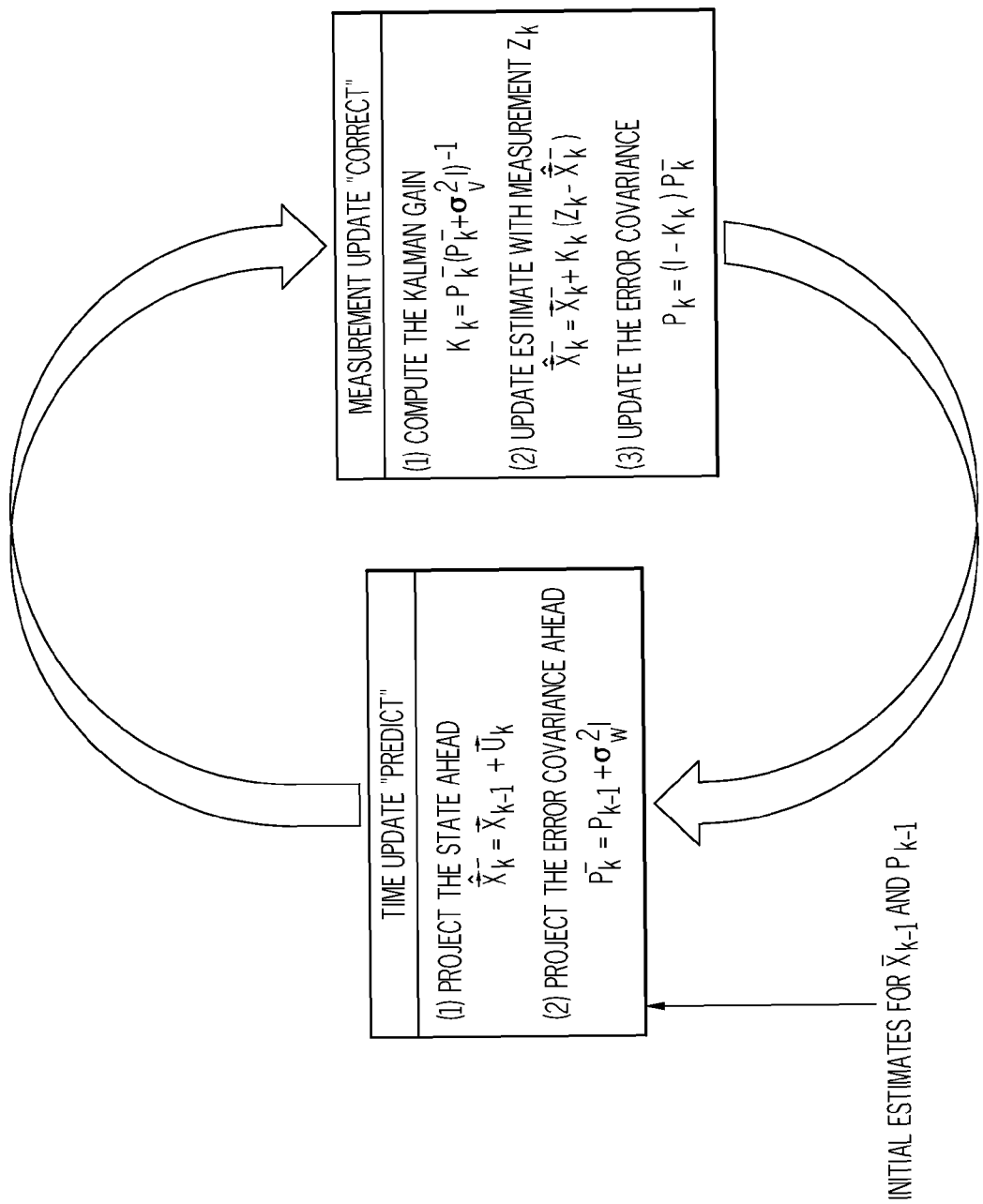
FIG. 4 illustrates Kalman filter equations applied to various embodiments of the present invention.

As such, the equations for the Kalman filter fall into two groups: time update equations and measurement update equations. The time update equation is responsible for projecting forward in time the current state and error covariance estimates to obtain the a priori estimates for the next time step. The measurement update equations are responsible for the feedback (i.e. for incorporating a new measurement into the a priori estimate to obtain an improved a posteriori estimate). The time update equations can also be thought of predictor equations, while the measurement update equations can be thought of as corrector equations. Indeed the final estimation algorithm resembles that of a predictor-corrector algorithm. After each time and measurement update pair, the process is repeated with the previous a posteriori estimates used to project or predict the new a priori estimates. FIG. 4 shows one embodiment of a Kalman filter design for runway segmentation.

The Kalman filter does not operate on all of the data directly for each estimate, rather it recursively conditions the current estimate on all of the past measurements. Starting with an initial predicted state estimate and its associated covariance obtained from past information, the Kalman filter calculates the weights to be used when combining this estimate with the first measurement vector to obtain an updated "best" estimate.

Camera 150 may be any camera known in the art or developed in the future. That is, camera 150 may be any system and/or device capable of capturing an image representative of the environment surrounding camera 150.

Processor 160 may be any system, device, hardware, software (e.g., instructions on a computer-readable medium), or combination thereof capable of receiving data from prediction module 110, measurement module 120, movement module 130, correlation module 140, and camera 150, an performing the various functions discussed above. That is, processor 160 is configured to combine prediction estimates with observation estimates to determine the location of a target from a moving platform. In other words, processor 160 is configured to weight the prediction estimate and/or the observation estimate based upon the perceived reliability of the prediction estimate and/or the observation estimate to determine the location of the target from a moving platform (e.g., an aircraft, terrestrial vehicle, watercraft, etc.). Specifically, processor 160 is configured to determine the location of the target based upon the perceived accuracy of the predicted current location of the platform or the observed current location of the platform. For example, if the observed current location of the platform (via camera 150) is perceived to be more accurate, the α coefficient or factor in equation (1) is a smaller ratio, whereas the opposite is true if the predicted current location from an earlier time period is perceived to be more accurate (i.e., the α coefficient or factor in equation (1) is a larger ratio).

The various embodiments disclosed above have been discussed with reference to an aircraft and a runway target. However, the spirit and scope of the invention is not limited to aircraft applications and runways. That is, the various embodiments discussed above are applicable to motor vehicles and watercraft. Furthermore, the target is not required to be a runway and may include other objects including, but not limited to, roadways, waterways, buildings, geographic features (e.g., hills, mountains, valleys, lakes, rivers, etc.), and the like targets.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

The invention claimed is:

1. A system for detecting a target from a moving platform, comprising:
    a single camera configured to generate first data representing an object having one or more sides, the first data representing the one or more major sides of the target,
    a movement module configured to estimate the present location of the target with respect to the moving platform, wherein the movement module comprises
    a memory storing second data representing a template of the target which includes sides of the target corresponding to at least each major side of the target,
    a second processor coupled to the camera and the memory, the second processor configured to:
        receive the first data and the second data, and
        determine that the object is the target if the one or more sides in the first data of the object match a set of sides contained in the second data in the template;
    a prediction module coupled to the movement module and configured to estimate future locations of the target based on estimates received from the movement module and movement characteristics of the moving platform; and
    a first processor coupled to the movement module and the prediction module, the first processor configured to:
        receive present location estimates from the movement module,
        receive future location estimates from the prediction module,
        store the future location estimates to create a first future location estimate, and
        determine the present location of the target based on the present location estimate from the first data calculated by the movement module, the first future location estimate from the prediction module, or both utilizing an auto regressive moving average.

2. The system of claim 1, wherein the prediction module comprises:
- a navigation system configured to detect the velocity of the platform and generate its movement characteristics;
- a third processor coupled to the navigation system and configured to:
  - receive the present location estimates,
  - receive the movement characteristics, and
  - predict a location of the platform with respect to the target based on the present location estimate and the movement characteristics.

3. The system of claim 1, wherein the first processor comprises a Kalman filter architecture.

4. The system of claim 1, wherein the first processor comprises a weighted-average filter architecture.

5. The system of claim 4, wherein the prediction module is configured to estimate future locations of the target using a vector velocity of the platform.

6. The system of claim 1, wherein the platform is an aircraft and the target is a runway.

7. The system of claim 1, wherein the platform is a motor vehicle.

8. A filter configured to determine a present relative location of a target from a moving platform, comprising:
- a single means for passively sensing the target;
- means for receiving an estimate of a present location of the moving platform utilizing only the data from the single means for passively sensing the target;
- means for receiving an estimate of a future location of the moving platform;
- memory configured to store the estimate of the future location of the moving platform; and
- means for determining the present location of the target based on the estimate of the present location of the moving platform, the estimate of the future location of the moving platform, or both utilizing an auto regressive moving average.

9. The filter of claim 8, wherein the filter comprises a Kalman filter architecture.

10. The filter of claim 8, wherein the filter comprises a weighted-average filter architecture.

11. The filter of claim 8, wherein the means for determining the present location of the target comprises means for determining which of the estimate of the present location of the moving platform or the estimate of the future location of the moving platform is more accurate.

12. The filter of claim 11, wherein the means for determining which of the estimate of the present location of the moving platform or the estimate of the future location of the moving platform is more accurate comprises means for applying a weighted factor to the more accurate one of the estimate of the present location of the moving platform or the estimate of the future location of the moving platform.

13. A method for determining a present location of a target from a moving platform, the method comprising the steps of:
- sensing the target by a single passive sensor;
- receiving an estimate of a present location of the moving platform utilizing only data from the single passive sensor;
- receiving an estimate of a future location of the moving platform; and
- determining the present relative location of the stationary target based on the estimate of the present location of the moving platform, the estimate of the future location of the moving platform, or both utilizing an auto regressive moving average.

14. The method of claim 13, wherein the step of determining the present location of the target comprises the step of determining which of the estimate of the present location of the moving platform or the estimate of the future location of the moving platform is more accurate.

15. The method of claim 13 wherein the step of determining which of the estimate of the present location of the moving platform or the estimate of the future location of the moving platform is more accurate comprises the step of applying a weighted factor to the more accurate one of the estimate of the present location of the moving platform or the estimate of the future location of the moving platform.

* * * * *